(12) United States Patent
Domokos et al.

(10) Patent No.: US 9,141,836 B2
(45) Date of Patent: Sep. 22, 2015

(54) RFID READER

(71) Applicant: Siemens Aktlengesellschaft, Munich (DE)

(72) Inventors: John Domokos, Emsworth (GB); Dieter Horst, Cadolzburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/031,205

(22) Filed: Sep. 19, 2013

(65) Prior Publication Data

US 2014/0015647 A1 Jan. 16, 2014

Related U.S. Application Data

(63) Continuation of application No. 12/152,576, filed on May 15, 2008, now abandoned.

(30) Foreign Application Priority Data

| May 15, 2007 | (GB) | .................................. 0709313.1 |
| Feb. 5, 2008 | (GB) | .................................. 0802055.4 |

(51) Int. Cl.
| H04Q 5/22 | (2006.01) |
| G06K 7/10 | (2006.01) |
| G06K 7/00 | (2006.01) |
| H04L 27/26 | (2006.01) |
| H04B 7/04 | (2006.01) |

(52) U.S. Cl.
CPC .......... *G06K 7/10366* (2013.01); *G06K 7/0008* (2013.01); *H04L 27/2601* (2013.01); *H04B 7/04* (2013.01)

(58) Field of Classification Search
USPC .................. 340/10.1–10.6, 572.1–572.9; 235/375–385
See application file for complete search history.

(56) References Cited

U.S. PATENT DOCUMENTS

| 5,483,172 | A  * | 1/1996  | Radford ....................... 324/693 |
| 5,771,021 | A  * | 6/1998  | Veghte et al. .......... 343/700 MS |
| 6,091,342 | A  * | 7/2000  | Janesch et al. ............... 340/10.2 |
| 6,107,910 | A  * | 8/2000  | Nysen ......................... 340/10.1 |
| 6,480,143 | B1 * | 11/2002 | Kruger et al. .................. 342/44 |
| 6,662,642 | B2 * | 12/2003 | Breed et al. ..................... 73/146 |
| 6,745,008 | B1 * | 6/2004  | Carrender et al. ........... 455/41.1 |
| 6,758,089 | B2 * | 7/2004  | Breed et al. ..................... 73/146 |
| 6,952,157 | B1 * | 10/2005 | Stewart et al. ............... 340/10.2 |
| 6,995,655 | B2 * | 2/2006  | Ertin et al. .................... 340/10.2 |
| 7,472,820 | B2 * | 1/2009  | Krampitz et al. ............. 235/375 |
| 7,602,313 | B2 * | 10/2009 | Breed et al. .................... 340/933 |
| 7,649,491 | B2 * | 1/2010  | Ohara et al. .................. 342/127 |
| 7,928,843 | B2 * | 4/2011  | Shanks et al. .............. 340/572.1 |
| 7,997,475 | B2 * | 8/2011  | Macurek et al. .............. 235/375 |
| 8,149,155 | B2 * | 4/2012  | Kawai .............................. 342/42 |
| 8,248,212 | B2 * | 8/2012  | Frederick .................... 340/10.3 |
| 2002/0121132 | A1 * | 9/2002 | Breed et al. ..................... 73/146 |
| 2003/0005759 | A1 * | 1/2003 | Breed et al. ..................... 73/146 |
| 2006/0001528 | A1 * | 1/2006 | Nitzan et al. ............... 340/10.33 |
| 2006/0267734 | A1 * | 11/2006 | Taki et al. .................... 340/10.4 |

(Continued)

*Primary Examiner* — Paul Obiniyi

(74) *Attorney, Agent, or Firm* — Cozen O'Connor

(57) ABSTRACT

An RFID reader is provided. The RFID reader includes a transmitter section and a receiver section. The transmitter section is configured to transmit a first RF signal which includes several carrier frequencies that are effective to simultaneously illuminate a tag at the plurality of carrier frequencies. The receiver section is configured to receive a second RF signal which includes several frequencies which each have the same information.

11 Claims, 3 Drawing Sheets

(56) References Cited

U.S. PATENT DOCUMENTS

2008/0180280 A1* 7/2008 Breed et al. .................. 340/901
2008/0186205 A1* 8/2008 Breed .......................... 340/901
2008/0197193 A1* 8/2008 Overhultz et al. ............ 235/383
2009/0195438 A1* 8/2009 Kawai .......................... 342/127

* cited by examiner

RFID READER

CROSS REFERENCE TO RELATED APPLICATIONS

This application is a continuation of U.S. application Ser. No. 12/152,576 filed May 15, 2008 which claims priority of United Kingdom Patent Office application No. 0709313.1 GB filed May 15, 2007 and of United Kingdom Patent Office application No. 0802055.4 GB filed Feb. 5, 2008. All applications are incorporated by reference herein in their entirety.

FIELD OF INVENTION

The mass application of passive ultra high frequency (UHF) radio frequency identification (RFID) systems is becoming widespread in the retail industry, logistics and commerce. In most applications, it is very important that all tags are interrogated successfully during an inventory round, and no tags are missed. Despite efforts in improving the performance of the current RFID systems, 100% success rate has not yet been reached in some applications.

BACKGROUND OF INVENTION

In passive RFID systems the tags receive their power from the RF field transmitted by the reader. The efficiency of the power transfer from the reader to the tags is essential for reliable operation.

It is well know in the art, that radio wave propagation suffers from multipath effects. In the presence of reflections, the power received by the tags varies over location and frequency. If the received power at the tag falls below the sensitivity threshold of the tag, the tag will be missed from the inventory. Typical sensitivity of the tags today is −15 dBm to −20 dBm.

There are two commonly used methods to minimize the effect of multipath propagation in RFID systems, space diversity and frequency hopping.

SUMMARY OF INVENTION

A typical gate reader employs several antennas that provide space diversity. First, the tags are interrogated from a first antenna. The majority of the tags, which receive adequate power, will respond. However, the tags which are in the nulls of the interference pattern are missed from the first reading cycle. Next, the tags are interrogated from a second antenna, which is located in a different position. From the second antenna, the multipath pattern is different and those tags which were in a null previously are now likely to be energized adequately. The interrogation is repeated, switching all antennas in a sequential fashion and therefore maximizing the read probability.

In addition to space diversity, in some systems, frequency hopping is also used to mitigate the multipath effects even further. In this case the tag population is interrogated at a certain frequency F1 first. After a pre-set time, when the interrogation is completed at F1, the reader is switched to a different frequency F2. At F2, the multipath pattern is different from that of F1 and those tags which were missed during the first reading cycle are now likely to be read. The interrogation is repeated, switching the reader to different frequencies in a sequential fashion and therefore maximizing the success rate.

In the frequency hopping system, the tags are illuminated one frequency at a time. The consecutive reading cycles at different frequencies are performed sequentially. This means that if there are N frequencies, and the time taken for a reading cycle is R, the total inventory time is $T_{inv}=N*R$.

Reading speed and success rate is a major competitive parameter for RFID systems. This is particularly the case in fast moving applications, or in cases where the tags are buried in the shadow of conductive items and therefore the illumination time is relatively short.

In accordance with a first aspect of the present invention an RFID reader comprises a receiver section for receiving an RF signal and a transmitter section for transmitting an RF signal; wherein the reader is a multicarrier RFID reader and both the transmitted RF signal and the received RF signal comprise at least two frequencies.

In the present invention, unlike in the frequency hopping systems, the tags are now illuminated at several frequencies simultaneously. This shortens the inventory time substantially, because the reading is performed at the several frequencies parallel. The total inventory time for a multicarrier reader is therefore $T_{inv}=R$.

Preferably, the receiver section comprises an input to receive an RF signal; a down converter stage to downconvert the RF signal to baseband; and a processor.

Preferably, the downconverter stage further comprises a splitter to split the received RF signal into its component frequency signals; and wherein each component signal is downconverted.

Alternatively, in a digital implementation, the RF signal undergoes a first downconversion stage using an RF carrier local oscillator, then a second downconversion stage for each individual carrier frequency.

Preferably, a down converter is provided for each of the split RF signals.

Preferably, the reader further comprises a baseband filter to filter out beat frequencies of the received, downconverted signal.

Preferably, the transmitter section comprises a baseband signal generator, an upconverter stage and an RF output.

Preferably, the upconverter stage further comprises a splitter to split a signal from the baseband signal generator into at least two frequencies; and wherein upconversion of each baseband signal is performed.

Alternatively, in a digital implementation, a first upconversion stage is carried out using a local oscillator at each individual carrier frequency, then a further upconversion stage is carried out using an RF carrier frequency local oscillator.

Preferably, an up converter is provided for each of the split baseband signals.

Preferably, the upconverter stage further comprises a summer to combine the upconverted signals for transmission.

Preferably, the baseband signal is generated in a baseband digital signal processor.

Preferably, the reader is a hand portable receiver.

Preferably, a single antenna is used for transmission and reception of the RF signals.

Alternatively, the reader is a gate reader.

Preferably, the gate reader comprises multiple antennas.

Preferably, the reader incorporates frequency hopping functionality.

BRIEF DESCRIPTION OF THE DRAWINGS

An example of an RFID reader according to the present invention will now be described with reference to the accompanying drawings in which.

DETAILED DESCRIPTION OF INVENTION

Figure 1:
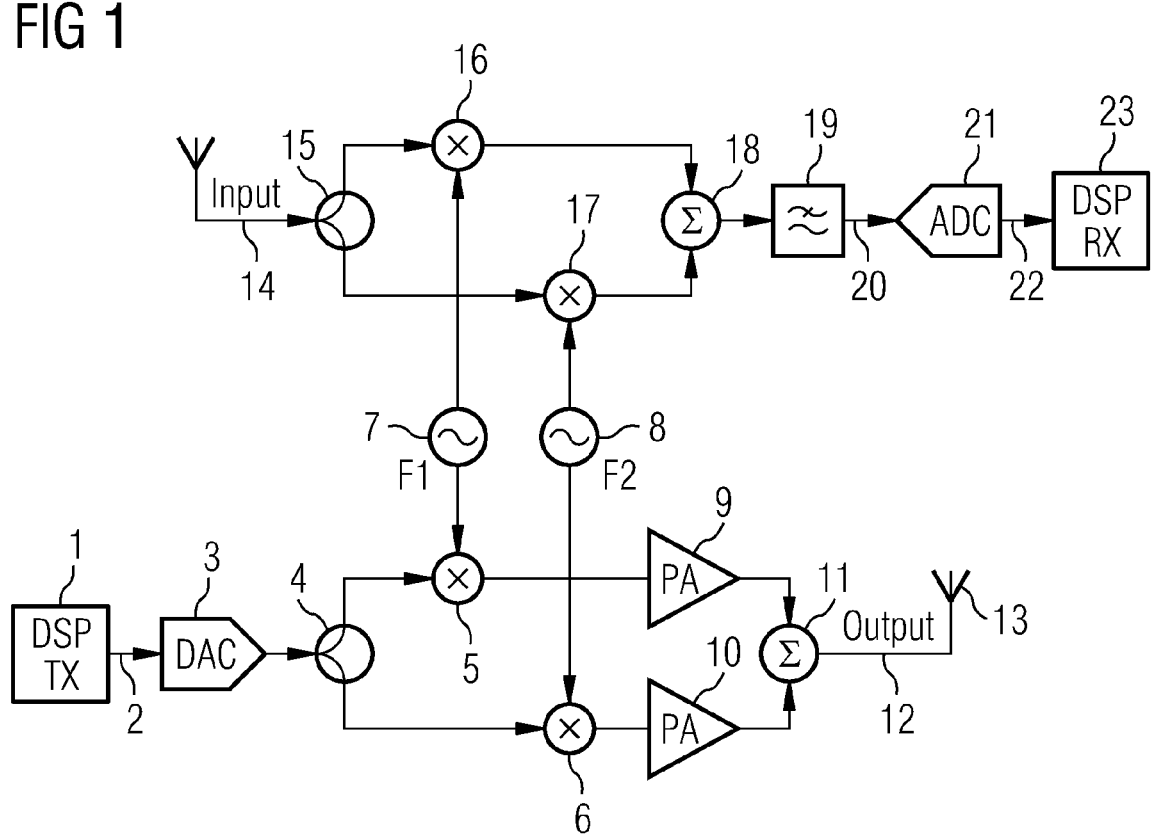
FIG. 1 illustrates an example of an RF implementation of an RFID reader according to the present invention.

FIG. 1 shows an example of a multicarrier reader according to the present invention in which the reader transmits and receives on two frequencies simultaneously. This example shows an implementation of the multicarrier architecture in the analog (RF) domain. A transmit baseband signal is generated in a digital signal processor (DSP) section 1 and then applied 2 to the digital to analogue converter 3. Up to this point the functionality of the multicarrier reader is the same as that in the single carrier architecture.

The baseband signal is split 4 and up-converted to F1 and F2 frequencies using two quadrature up-converters 5, 6 which are fed with F1 and F2 signals from respective local oscillators 7, 8. The up-converted signals are amplified 9, 10 summed 11 and output 12 applied to an antenna 13.

For simplification, in FIG. 1 the complex I and Q paths are not shown separately. Each device is duplicated in the actual transceiver processing two independent, I and Q channels.

The transmitted signal containing F1 and F2 frequency components arrives at tags (not shown). The tags have no means of distinguishing between the different frequencies and therefore 'see' an input signal which has the power of both waves propagating at F1 and F2 frequencies.

There is a beat note present at the input of the tag at a frequency of F2−F1. This frequency needs to be filtered out after rectification within the tag. Ordinary RFID tags already have such low pass filtering for both energy storage and for interference rejection. However, the low pass filtering time constant may need to be increased to smooth out the beat note of the multi-carrier signal. The tags backscatter the received CW signal at both F1 and F2 frequencies.

In the receiver, the incoming RF signal 14 that contains F1 and F2 components is split with a power divider 15. A quadrature down-converter 16 down converts the input signal to baseband I and Q components, using the local oscillator 7 that operates at F1 frequency. A second downconversion is also performed with a second quadrature down-converter 17 and the local oscillator 8 that operates at F2 frequency. The baseband signals are summed up with a combiner 18.

A low pass filter 19 is provided which has an additional role compared to anti-aliasing filters used in single carrier readers. In the multicarrier receiver a beat note is present in the baseband at a frequency of F2−F1. This needs to be removed before the signal is applied to the analogue to digital converter. At the output 20 of the low pass filter 19, the baseband signal contains only the I Q components of the back-scattered signal emitted by the tags at both frequencies. From here, the architecture of the reader is similar to that in other single carrier applications. An analogue to digital converter (ADC) 21 converts the output 20 to a digital signal 22 which is processed in a digital signal processor 23.

Figure 2:
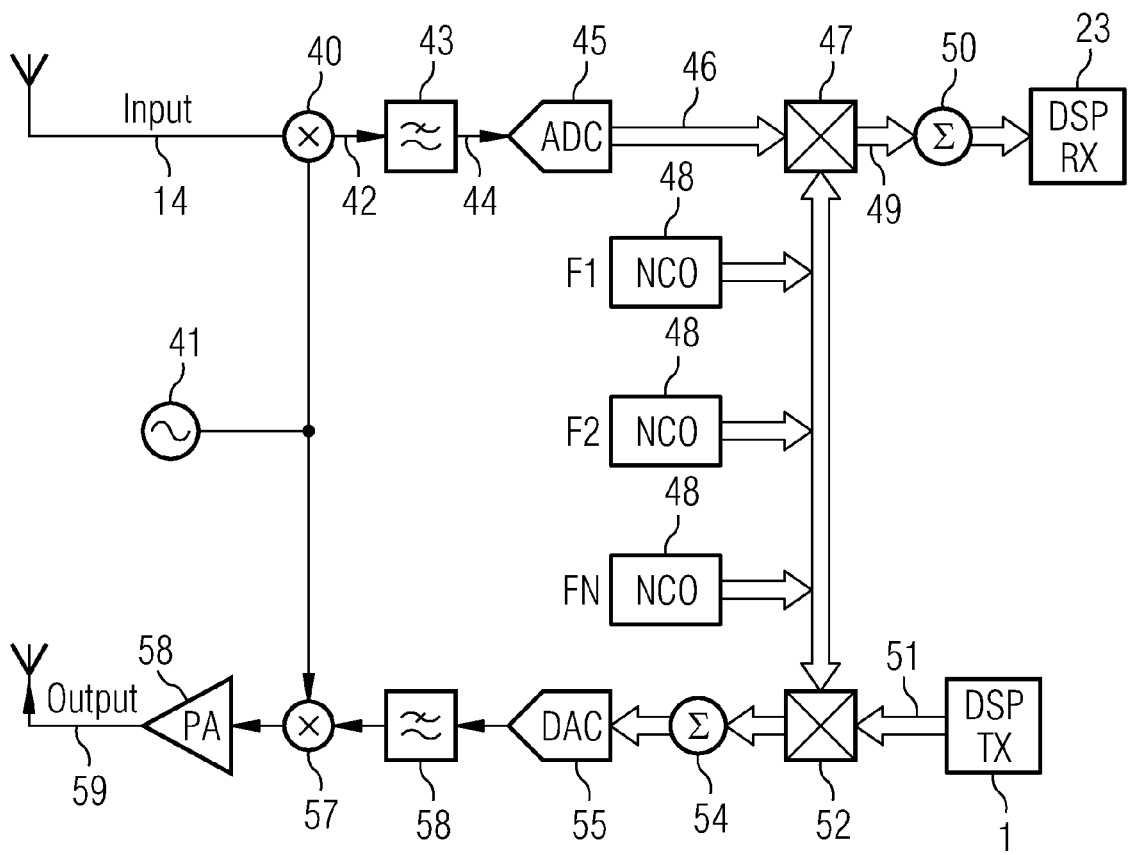
FIG. 2 shows an example of a digital implementation of a multicarrier reader according to the present invention; and, FIG. 3 is a graph of amplitude against distance from tag to reflecting surface, showing how power transfer in a typical multipath environment is improved using the RFID reader of FIG. 1.

The invention is not restricted to transmitting two carriers only. Generally, as the number of carriers and the occupied bandwidth increase, the protection against multipath effects improves. Increasing the number of carriers and the bandwidth of the reader minimizes the depth of the nulls. For large number of carriers it may be advantageous to generate the multi-carrier signal in a baseband DSP. For this, complex mixers and numerically controlled oscillators may be used to shift the signals to different frequencies and then sum up the F1,F2 . . . Fn components. In this case only a single up and down-conversion is necessary in the RF domain, but the DSP and the analogue to digital conversion becomes more difficult. An example of an implementation of a multicarrier architecture in the digital domain is shown in FIG. 2.

In this example, the RF input 14 is down converted in down converter 40 using an RF carrier frequency local oscillator 41. The downconverted signal 42 is passed through a low pass filter 43 and after down-conversion, the entire RF bandwidth of the signal 44 is digitized with a broadband analogue to digital converter (ADC) 45. The individual carriers are then further down-converted 47 to DC using numerically controlled oscillators (NCO's) 48 tuned to their respective carrier frequencies (F1, F2 . . . Fn. The baseband signals 49 are combined 50 in the DSP receiver 23 in a coherent fashion.

In the DSP transmitter 1, several carriers 51 are modulated 52 with data using their respective NCOs 48. These signals 53 are summed 54 and then converted to the analogue domain in a digital to analogue converter 55. The analogue signal passes through a low pass filter 56 and the multicarrier signal is then up-converted 57 to the final RF frequency using the local oscillator 41. The upconverted signal is further amplified in power amplifier 58 and output 59. The power amplifier amplifies an amplitude variant signal and therefore needs to be linear.

Figure 3:
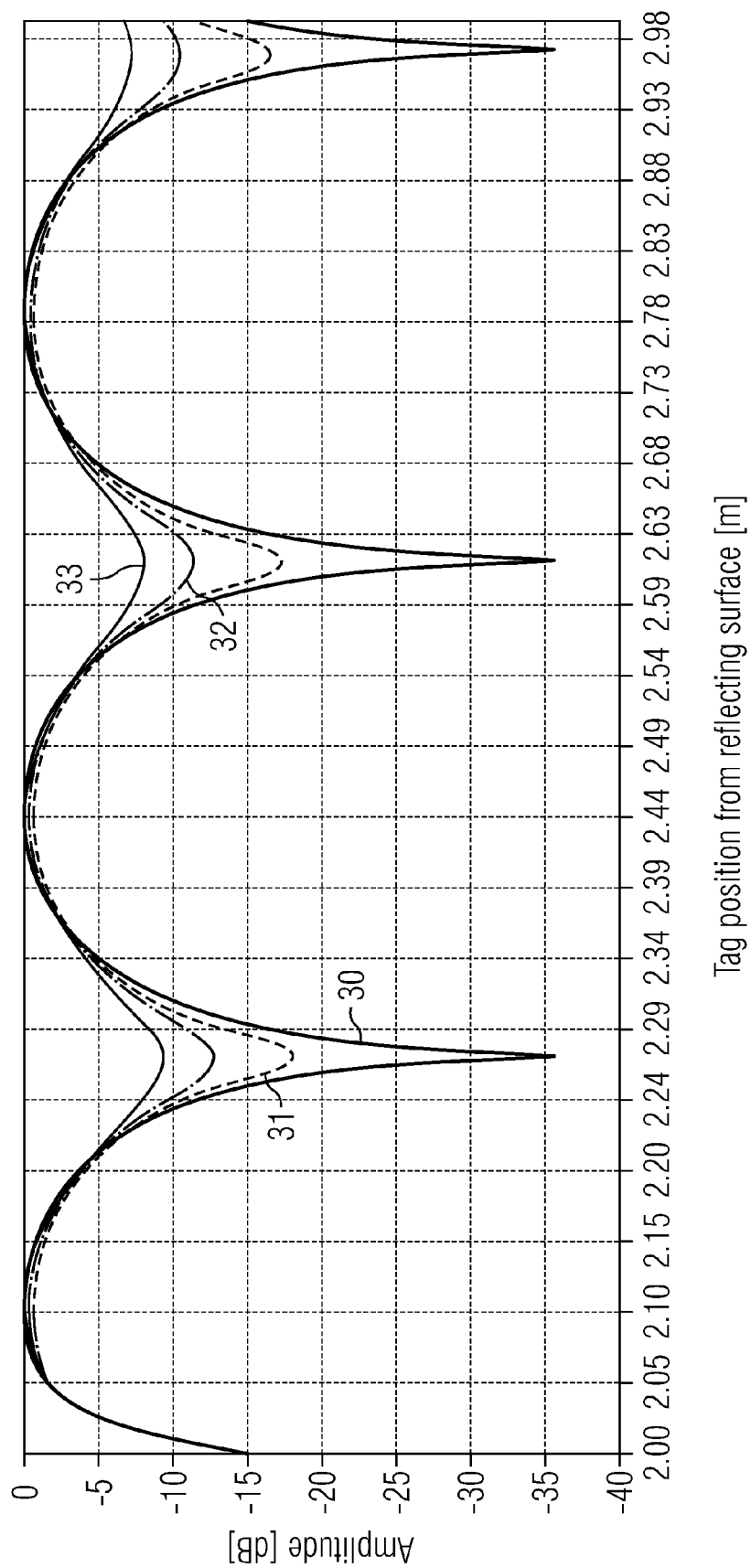

The benefits of the present invention can be seen in FIG. 3. Passive RFID devices operate over a short range of up to 5 m. In such an environment, the delay spread is very short. This means that substantial improvements in power transfer can be achieved even with a very few carriers. In FIG. 3, the relative path loss is simulated between the reader and the tag in a typical multipath environment. A reflecting surface is placed 2 m away from the tag and the tag is moved along the interrogation field from a position of 2 m to 3 m away from the reflecting source. In a single carrier case, the graph 30 shows the depth of the nulls is −35 dB. With two carriers this is improved to −18 dB for 10 MHz, shown in the graph 31; −12.5 dB for 20 MHz, shown in the graph 32 and −9 dB for 30 MHz spacing shown in the graph 33.

Assuming that the tags operate down to −20 dB relative amplitude, in the single carrier case in three locations the tags would be missed. By contrast, with two carriers spaced even 10 MHz apart the tags would be always read. This is a considerable improvement in power transfer and success rate, giving a reader with better reliability and performance than conventional readers.

A multicarrier reader with one antenna may be provided for hand-held applications. A multicarrier reader with multiple antennas may be provided for gate readers. In either case, a multicarrier reader may include frequency hopping as well.

Frequency hopping does not effect the architecture, but does alter the way in which the NCO's are controlled. Without frequency hopping, all the NCO's 48 are tuned permanently to their individual carrier frequencies. In the case of frequency hopping, the carrier frequencies are also changing from time to time. By altering the way the carriers are combined from slot to slot, the nulls of the multipath responses are reduced further. In future, further RF frequencies may be allocated for RFID applications. Should the analogue bandwidth becoming available for frequency hopping exceed the bandwidth of the ADC and DAC devices, for these cases the frequency hopping would be implemented in the analogue domain. In this case the local oscillator 41 is tuned from slot to slot and the NCOs 48 remain fixed.

The invention claimed is:

1. An RFID reader, comprising: a transmitter section configured to transmit a first RF interrogation signal comprising a plurality of carrier frequencies effective to simultaneously illuminate a tag at the plurality of carrier frequencies; and a receiver section configured to simultaneously receive a second RF response signal comprising a plurality of carrier frequencies have having the same information substantially while the transmitter simultaneously illuminates the tag at the first RF interrogation signal comprising the plurality of carrier frequencies, wherein the transmitter section comprises a digital signal processor and a modulation stage, wherein the digital signal processor creates a baseband signal which is modulated at the modulation stage creating a plurality of signals each with a different frequency, the plurality of signals used in forming the first RF interrogation signal, wherein the receiver stage includes a plurality of downconversion stages so that the second RF response signal simultaneously undergoes a plurality of downconversions using the RF carrier frequency local oscillators from the transmitter section.

2. The RFID reader according to claim 1, wherein the transmitter section comprises a summer and an upconverter stage; wherein the modulation stage includes an oscillator for each different frequency; wherein the summer receives the output from the modulation stage and combines the output from the modulation stage into a multicarrier signal; and wherein the multicarrier signal is provided to the upconverter stage and converted to the first RF interrogation signal comprising the plurality of frequencies.

3. The RFID reader according to claim 2, wherein the upconverter stage comprises an RF carrier frequency local oscillator.

4. The RFID reader according to claim 1, wherein the second RF response signal received from the tag is based on the first RF interrogation signal.

5. The RFID reader according to claim 1, wherein at least one of the plurality of downconversion stages comprises numerically controlled oscillators.

6. The RFID reader according to claim 1, wherein the RFID reader is a gate reader.

7. The RFID reader according to claim 6, wherein the gate reader comprises a plurality of antennas.

8. The RFID reader according to claim 1, wherein the RFID reader incorporates frequency hopping functionality.

9. The RFID reader according to claim 1, wherein the multicarrier RFID is a hand portable receiver.

10. The RFID reader according to claim 1, wherein each of the plurality of RFID carrier frequencies are at least 10 MHz apart.

11. An RFID system, comprising: the RFID reader according to claim 1; and a tag which receives the first RF interrogation signal from the reader, the tag comprising a modulator configured to transmit the second RF response signal.

* * * * *